(12) United States Patent
Sa

(10) Patent No.: US 8,461,805 B2
(45) Date of Patent: Jun. 11, 2013

(54) RECHARGEABLE BATTERY PACK WITH CONNECTING PORTS FOR INTERNAL AND EXTERNAL CHARGING/OUTPUT OPERATIONS

(76) Inventor: Shuang Sa, Richmond (CA)

( * ) Notice: Subject to any disclaimer, the term of this patent is extended or adjusted under 35 U.S.C. 154(b) by 205 days.

(21) Appl. No.: 12/819,761

(22) Filed: Jun. 21, 2010

(65) Prior Publication Data

US 2010/0320967 A1  Dec. 23, 2010

Related U.S. Application Data

(60) Provisional application No. 61/219,323, filed on Jun. 22, 2009.

(51) Int. Cl.
*H01M 10/46* (2006.01)

(52) U.S. Cl.
USPC .......................................................... 320/111

(58) Field of Classification Search
USPC .... 320/107, 111, 112, 114, 115, 150; 429/96, 429/97, 98, 99, 100
See application file for complete search history.

(56) References Cited

U.S. PATENT DOCUMENTS

| | | | | |
|---|---|---|---|---|
| 5,506,488 | A * | 4/1996 | Leiserson | 320/112 |
| 5,608,303 | A * | 3/1997 | Leiserson | 320/113 |
| 7,019,420 | B2 | 3/2006 | Kogan et al. | |
| 2005/0231159 | A1 * | 10/2005 | Jones et al. | 320/114 |
| 2005/0231161 | A1 * | 10/2005 | Jones et al. | 320/114 |
| 2007/0132427 | A1 | 6/2007 | Veselic | |
| 2007/0273327 | A1 | 11/2007 | Daniel et al. | |
| 2008/0150367 | A1 | 6/2008 | Oh et al. | |
| 2008/0238356 | A1 * | 10/2008 | Batson et al. | 320/103 |
| 2008/0284371 | A1 | 11/2008 | Hsu | |
| 2009/0128091 | A1 | 5/2009 | Purdy et al. | |

OTHER PUBLICATIONS

Title: Tekkeon—myPwer ALL plus MP3750; Source: www.tekkeon.com/products-mypowerall.htm; 3 pages.
Title: MusicPower 0900-72 Encore Dual Port USB AC Charger with Rechargeable Extended Battery; Source: www.amazon.com; 7 pages.
Title: USB Battery Box—Convert 4 AA Batteries to USB Port Power; Source: www.bixnet.com; 6 pages.

* cited by examiner

*Primary Examiner* — Edward Tso
(74) *Attorney, Agent, or Firm* — Cozen O'Connor

(57) ABSTRACT

The embodiments relate to a rechargeable battery pack capable of both internal and external charging/output operation. The rechargeable battery pack has an internal connecting port, which is configured to directly connect to an internal electrical contact in an electronic device during an internal charging/output operation when such battery pack is installed inside an electronic device. The rechargeable battery pack also has at least one external connecting port, which is operable during at least one of external charging and output operations of the rechargeable battery pack when the battery pack is removed from the electronic device. The external connecting port allows the rechargeable battery pack to be externally connected to an external charging connecter during an external charging operation or to a second electronic device or second rechargeable battery pack during an external output operation.

20 Claims, 5 Drawing Sheets

RECHARGEABLE BATTERY PACK WITH CONNECTING PORTS FOR INTERNAL AND EXTERNAL CHARGING/OUTPUT OPERATIONS

CROSS-REFERENCE TO RELATED APPLICATION

This patent application claims priority from U.S. Provisional Patent Application No. 61/219,323 filed Jun. 22, 2009.

BACKGROUND OF THE INVENTION

1. Field of the Invention

The invention relates generally to a rechargeable battery pack. In particular, the invention relates to a rechargeable battery pack with one or more connecting ports for internal charging/output operations of the rechargeable battery pack, when the battery pack is installed in an electronic device, and external charging/output operations of the rechargeable battery pack, when the battery pack is removed from the electronic device.

2. Description of the Related Art

Rechargeable batteries have been widely used for powering electronic devices. A conventional rechargeable battery is typically formed with a connecting port to facilitate an internal charging/output operation of the rechargeable battery when the battery is installed inside an electronic device. For example, the connecting port of a rechargeable battery can be formed as a pin connecter set. When such a rechargeable battery is installed inside an electronic device, the battery supplies power to the device through the pin connecter set.

When the rechargeable battery is removed from the electronic device, the battery may be charged by a specially designed charger dock during an external battery charging operation. For example, such a specially designed charger dock is typically designed by manufacturer of the battery and/or the electronic device to include a complementary pin connecter set.

The connecting ports of rechargeable batteries are designed by the manufacturers of the rechargeable batteries or electronic devices using the rechargeable batteries. Due to the various specific connecting port designs for the different types of rechargeable batteries, battery charging operation at the user's end is often limited to an internal battery charging operation, during which the rechargeable batteries are installed inside the electronic devices. External battery charging operation carried out directly on the batteries is typically not readily available.

SUMMARY OF THE INVENTION

The invention is generally directed to a rechargeable battery pack and, more specifically, a rechargeable battery pack suitable for both internal and external charging/output operations. The rechargeable battery pack has an internal connecting port, which is configured to directly connect to an electrical contact formed in the electronic device during an internal charging/output operation when such rechargeable battery pack is installed inside the electronic device.

The rechargeable battery pack also includes at least one external connecting port, which is operable during at least one of external charging and output operations of the rechargeable battery pack when the rechargeable battery pack is removed from the electronic device. The external connecting port allows the rechargeable battery pack to be externally connected to an external charging connecter and be charged without being installed in any electronic device. Additionally or alternatively, the external connecting port of the rechargeable battery pack can be electrically connected to a second electronic device or a second rechargeable battery pack, so that the rechargeable battery pack can supply power to such second electronic device or such second rechargeable battery pack during an external output operation, in which the rechargeable battery pack is not installed in the second electronic device.

BRIEF DESCRIPTION OF THE DRAWINGS

The following description is set forth in connection with the attached drawing figures, which are not necessarily to scale, emphasis instead generally being placed upon illustrating the principles of the invention. In the drawing figures.

DETAILED DESCRIPTION OF EMBODIMENTS

Figure 1:
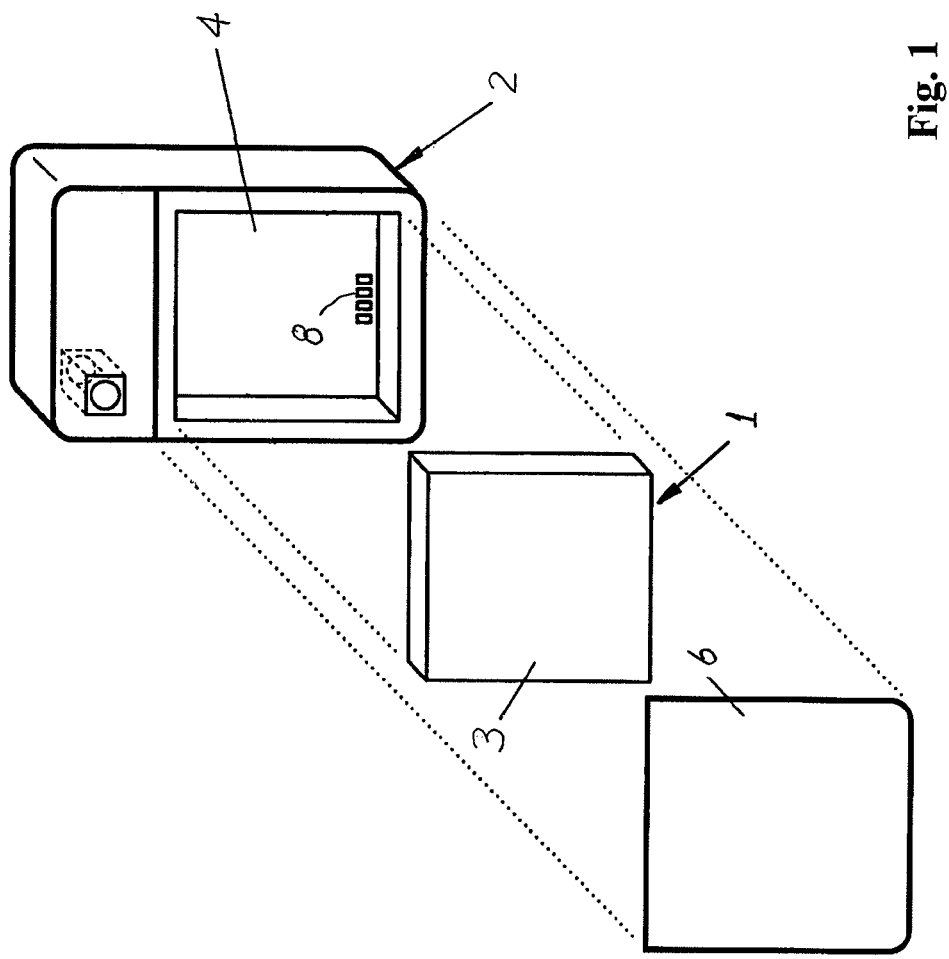
FIG. 1 is an exploded perspective view of an electronic device containing a rechargeable battery pack.

Various embodiments of the rechargeable battery pack 1 are described below in connection with the drawing figures. In the following description of different embodiments, similar components are designated with the same numeral references and redundant description is omitted.

FIG. 1 shows a rechargeable battery pack 1 for use in connection with an electronic device 2 of various known or hereafter developed forms, such as a mobile phone or a digital camera. The rechargeable battery pack 1 has a battery housing 3 for containing a battery 50 (see FIG. 3) of various known or hereafter developed forms. As FIG. 1 shows, the rechargeable battery pack 1 is configured to be installed in the electronic device 2, such as to fit inside a battery chamber 4 in the electronic device 2, during its normal use. A battery cover 6 can be used to enclose and retain the rechargeable battery pack 1 inside the battery chamber 4 during the normal use of the electronic device 2.

Figure 2:
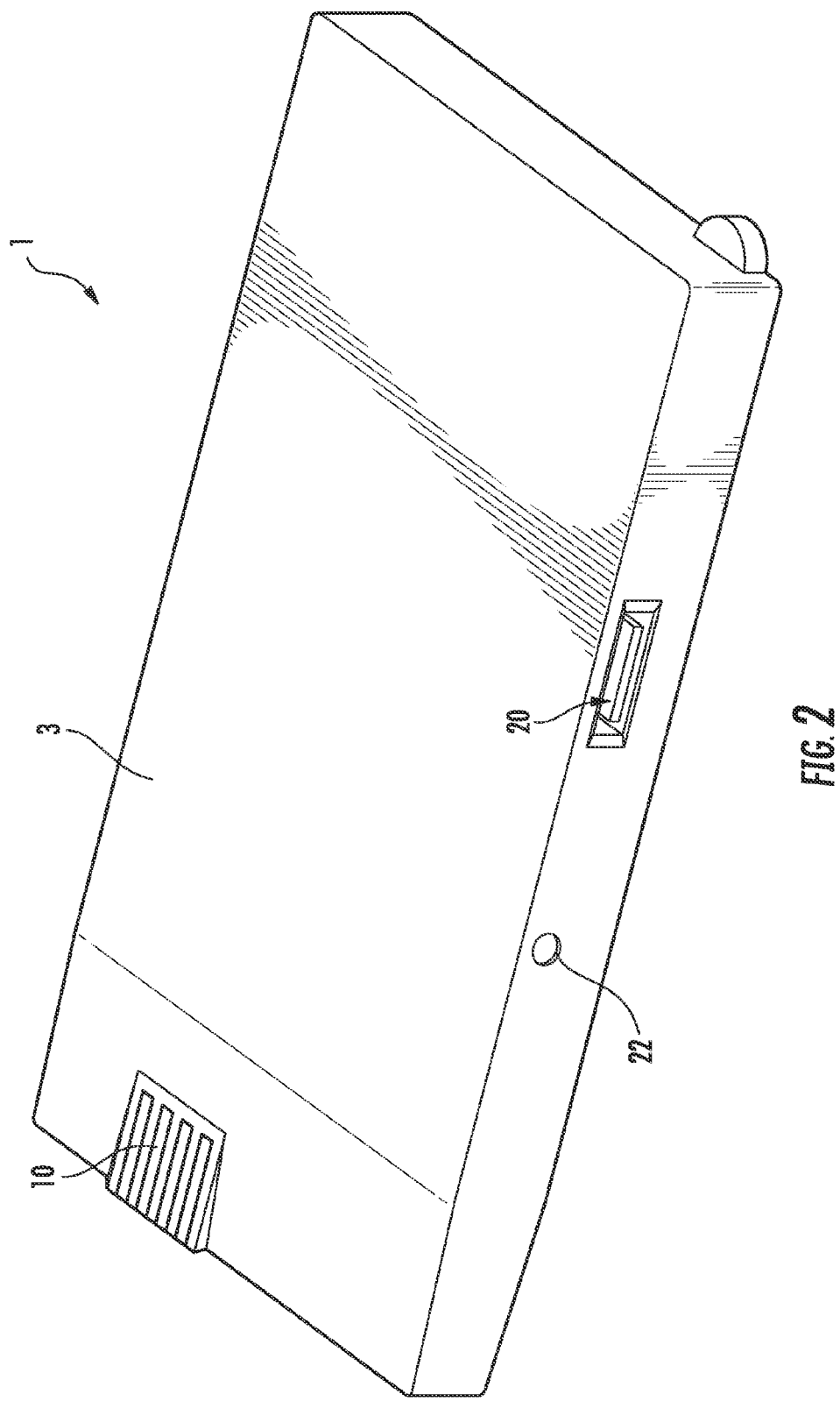
FIG. 2 is a perspective view of a rechargeable battery pack formed according to a first embodiment.

The rechargeable battery pack 1 is configured to electrically connect to the electronic device 2 during an internal charging/output operation of the rechargeable battery pack 1 to either supply power to the electronic device 2 or to charge the rechargeable battery pack 1. In the example of FIG. 2, the rechargeable battery pack 1 can be formed with a first connecting port 10 in the battery housing 3. The first connecting port 10 is configured to electrically connect to an internal electrical contact 8 of the electronic device 2, in a similar matter as the charging/output port on a conventional rechargeable battery, during an internal battery output operation when the rechargeable battery pack 1 is installed inside the electrical device 2. For example, the first connecting port 10 can include a set of connecter pins, which is arranged to electrically connect to the internal electrical contact 8 in the form of a complementary pin connecter set formed in the battery chamber 4 inside the electronic device 2. As one skilled in the art will appreciate, the first connecting port 10 can also be in various other forms of known and hereafter developed connections to electrically connect to an internal contact 8 of the electric device 2.

Additionally or alternatively, the rechargeable battery pack 1 can be electrically connected to an external charging port (not shown) formed on the electronic device 2 during an internal battery charging operation, when the rechargeable battery pack 1 is installed inside the electrical device 2. For example, the first connecting port 10 of the rechargeable battery pack 1 can be electrically connected to an external charging port (not shown) formed on the electronic device 2. The external charging port of the electronic device 2 can be of any of various electrical port, such as a USB type port. When the electronic device 2 is coupled to an additional external power source, the rechargeable battery pack 1 can be charged while remaining inside the battery chamber 4 of the electronic device 2.

Figure 3:
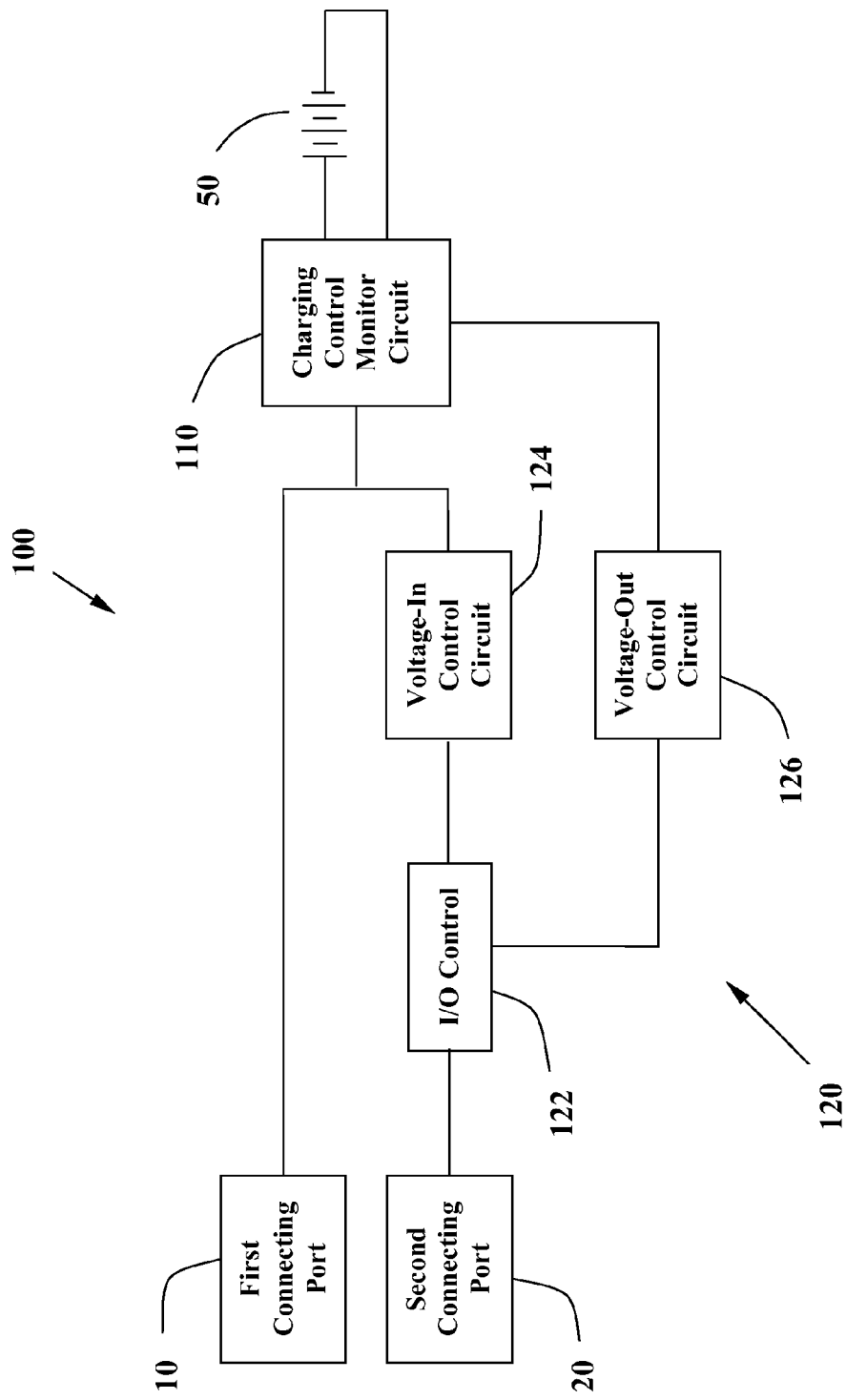
FIG. 3 is a block diagram of the rechargeable battery pack shown in FIG. 2.

FIG. 2 shows that the rechargeable battery pack 1 further includes a second connecting port 20, which is formed in the battery housing 3 and can be electrically connected to a battery control circuit 100 of the rechargeable battery pack 1, as is shown in FIG. 3 and described in more detail below. The second connecting port 20 is operable during at least one of external charging and output operations, when the rechargeable battery pack 1 is removed from the battery chamber 4 in the electronic device 2 and directly or indirectly connects to an external charging device (not shown) or another electronic device 2, respectively. For example, the rechargeable battery pack 1 can be connected to the external charging device through a connection cable with proper external charging connecters.

The second connecting port 20 can be in any of various forms. In one example, the second connecting port 20 is a USB type port, such as a mini USB port or a micro USB port. As one skilled in the art will appreciate, the second connecting port 20 can be in various other known or hereafter developed forms including, but not limited to, a set of connecter pins and a receiving port for receiving various power connecters, such as a computer power cable connecter or a pin plug connecter.

In the embodiment shown in FIG. 2, the second connecting port 20 is separate from the first connecting port 10, so that the rechargeable battery pack 1 has two connecting ports 10, 20. In one example, the first connecting port 10 can be designed by the maker of the rechargeable battery pack 1 and/or the electronic device 2 to ensure the compatibility between the rechargeable battery pack 1 and the electronic device 2.

In a preferred embodiment, the second connecting port 20 can be formed as a standard and/or universal port, such as a USB type port. Such second connecting port 20 can facilitate an electrical connection to an external standard charging port (e.g., in the form of a complementary USB type plug) during an external charging operation. Additionally or alternatively, the second connecting port 20 can be used during an external output operation and directly connected either to another electronic device 2 or to another second connecting port 20 of a similarly formed rechargeable battery pack 1 via an additional connecter. Detailed discussion of the operation of the first and second connecting ports 10, 20 of the rechargeable battery pack 1 is provided below.

FIG. 3 is a block diagram of the battery control circuit 100 of the rechargeable battery pack 1 shown in FIG. 2. The battery control circuit 100 contains a charging control monitor circuit 110 connected to a battery 50, such as a Li-type battery. The charging control monitor circuit 110 can be formed in any of various ways to control the internal charging/output operation of the rechargeable battery pack 1 as understood by one skilled in the art. For example, the control monitor circuit 110 carries out thermal management of the battery 50 during at least one of the external charging and output operations of the rechargeable battery pack 1. In the example of FIG. 3, the control monitor circuit 110 is connected to carry out thermal management of the battery 50 during both the internal and external charging/output operations of the rechargeable battery pack 1.

The battery control circuit 100 of the rechargeable battery pack 1 also contains one or more control circuits 120 for connecting the second connecting port 20 to the battery 50 and operable to control the external charging/output operation of the rechargeable battery pack 1. Such control circuits 120 can include charging and/or output control circuits similar to those employed in the electronic device 2 for internal charging/output operations of the rechargeable battery pack 1.

In the example shown in FIG. 3, such control circuits 120 can include an I/O control circuit 122 and voltage control circuits 124, 126 electrically connected between the second connecting port 20 and the charging control monitor circuit 110. In one example, the voltage control circuits 124, 126 are electrically connected between the I/O control circuit 122 and the charging control monitor circuit 110. In another example, the voltage control circuits 124, 126 can include a voltage-in control circuit 124 and a voltage-out control circuit 126 connected to each other in a parallel manner. Additional circuits can be incorporated in the battery control circuit 100 to control the external charging/output operation of the rechargeable battery pack 1, as is discussed in the embodiments below.

In the example of FIG. 3, the I/O control circuit 122 of the control circuits 120 is electrically connected to the second connecting port 20 and operates to determine a battery charging state or a power supply state of the rechargeable battery pack 1 via the second connecting port 20. Depending on the operation state determined, the I/O control circuit 122 switches to a corresponding voltage control circuit 124, 126 for carrying out the battery charging operation or the power supply operation of the rechargeable battery pack 1. For example, if the I/O control circuit 122 detects that the rechargeable battery pack 1 has a lower voltage than the voltage input to the second connecting port 20, the I/O control circuit 122 determines that the rechargeable battery pack 1 is connected to a power source (not shown) in order to carry out a battery charging operation. In such a case, the I/O control circuit 122 operates to connect to the voltage-in control circuit 124 for charging the rechargeable battery pack 1.

In one example, the I/O control circuit 122 can be in the form of a switch 22 (see FIG. 2), which allows the user to manually select between a battery charging state and a power supply state of the rechargeable battery pack 1. For example, when a rechargeable battery pack 1 is externally connected to a further electronic device or a further rechargeable battery pack (not shown), the user can manually operate the switch 22 on the rechargeable battery pack 1 to a battery charging state, thereby forcing the rechargeable battery pack 1 to charge such further electronic device or further rechargeable battery pack. Such charging operation can continue until the further electronic device is fully charged or until the rechargeable battery pack 1 runs out of power.

The voltage-in control circuit 124 of the control circuits 120 can be formed in various ways to control the battery charging operation. In one embodiment, the voltage-in control circuit 124 operates to convert a higher voltage input from the second connecting port 20 to a charging voltage of the battery 50. For example, a 5V voltage charging resource is input to the second connecting port 20 through a USB power cable. The I/O control circuit 122, after determining a battery charging state, activates the voltage-in control circuit 124 to convert the input voltage to 4.2V for charging a Li-type battery 50. As one skilled in the art will appreciate, the voltage-in control circuit 124 can be formed similar to a battery charging control circuit.

The voltage-out control circuit 126 of the control circuits 120 can be formed in various ways to control a power supply operation of the rechargeable battery pack 1 during an external output operation. For example, when a 3.7V voltage input is applied to the second connecting port 20, the I/O control circuit 122 detects such input voltage and determines a power supply state of the rechargeable battery pack 1. In such a case, the voltage-out control circuit 126 is activated to allow the battery 50 to supply power to a connected electronic device 2 through the second connecting port 20. As one skilled in the art will appreciate, the voltage-out control circuit 126 can be formed similar to a power supply control circuit.

As is described above, the second connecting port 20 of the rechargeable battery pack 1 described herein can be used as both a battery charging port and a power output port. In another example, only one of the voltage-in and voltage-out control circuits 124, 126 is used in the battery control circuit 100 of the rechargeable battery pack 1. In such a case, the second connecting port 20 of the rechargeable battery pack 1 is one-direction port and function as either a battery charging port or a power output port; the I/O control circuit 122 can be omitted.

In the example shown in FIG. 3, these control circuits 122, 124, 126 and the second connecting port 20 are electrically parallel to the first connecting port 10. As a result, either the first connecting port 10 or the second connecting port 20 can be used as input to charge the battery 50 and/or as output to supply power to an electronic device 2. For example, when the rechargeable battery pack 1 is installed inside of an electronic device 2 (e.g., a mobile phone or a tablet computer), the rechargeable battery pack 1 can be charged using the first connecting port 10, such as a pin connecter set shown in FIG. 2. In an alternative example, the rechargeable battery pack 1 can be charged outside the electronic device 2 using the second connecting port 20. In addition, the second connecting port 20 can be used as power output port, so that the rechargeable battery pack 1 can be used as an external or backup battery for various other electronic devices 2 or other rechargeable battery packs 1.

Figure 4A:
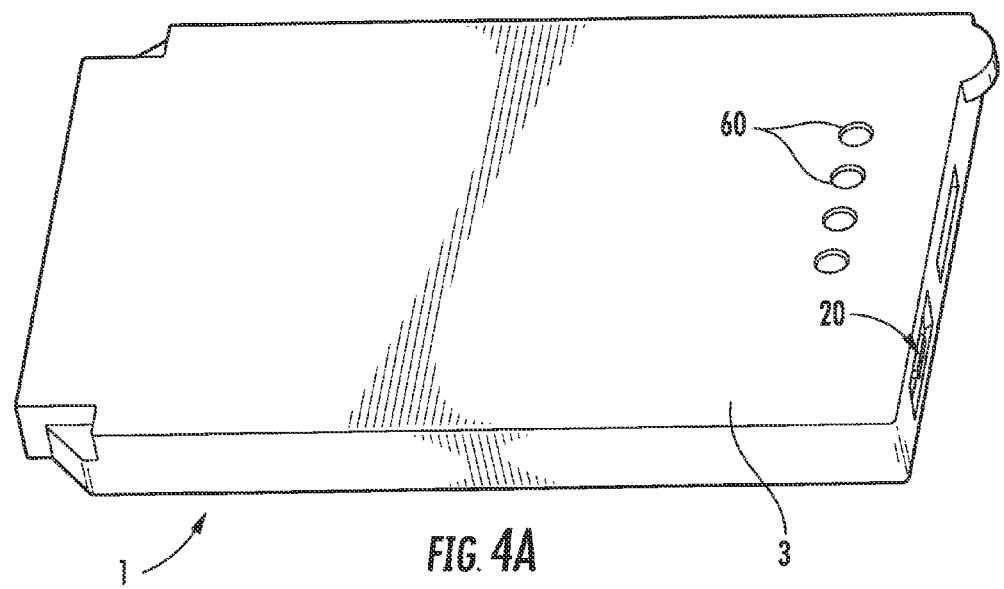
FIG. 4a is a perspective view of a rechargeable battery pack formed according to a second embodiment.

FIG. 4a shows a rechargeable battery pack 1 formed according to a second embodiment, where the second connecting port 20 is formed at different locations of the rechargeable battery pack 1. As FIG. 4a shows, the second connecting port 20 is in the form of a USB type port. Such a second connecting port 20 can be merged with the first connecting port 10 discussed in the above embodiment and be used in both internal and external charging/output operations of the rechargeable battery pack 1.

Figure 4B:
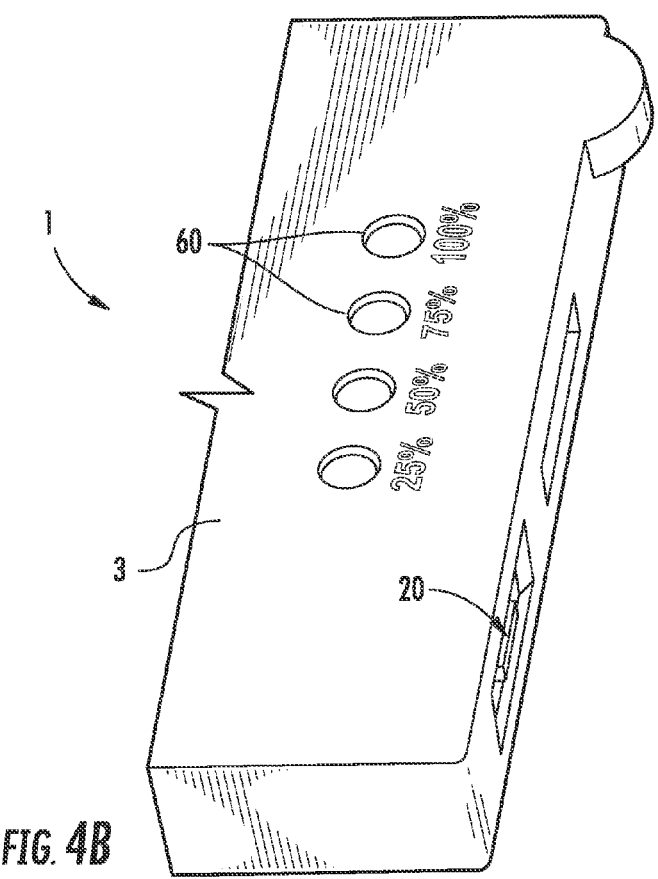
FIG. 4b is a partial enlarged view of the rechargeable battery pack shown in FIG. 4.

As FIGS. 4a and 4b show, a battery indicator 60 can be formed on the rechargeable battery pack 1 to show the available capacity and charging status of the rechargeable battery pack 1. The battery indicator 60 is electrically coupled to the battery 50 through and controlled by a volume indicator circuit 130 as discussed below. Such battery indicator 60 is advantageous to notify the user of the battery capacity when the rechargeable battery pack 1 operates outside the electronic device 2. For example, the indicator 60 can include one or more LED indicators 60 showing the levels of the available battery capacity. As is best illustrated in FIG. 4b, multiple LED indicators 60 can be provided to indicate the available battery capacity at 25%, 50%, 75%, and 100% of the full battery capacity of the rechargeable battery pack 1. As one skilled in the art will appreciate, other types of battery indicators 60 can also be used for the same purpose.

Figure 5:
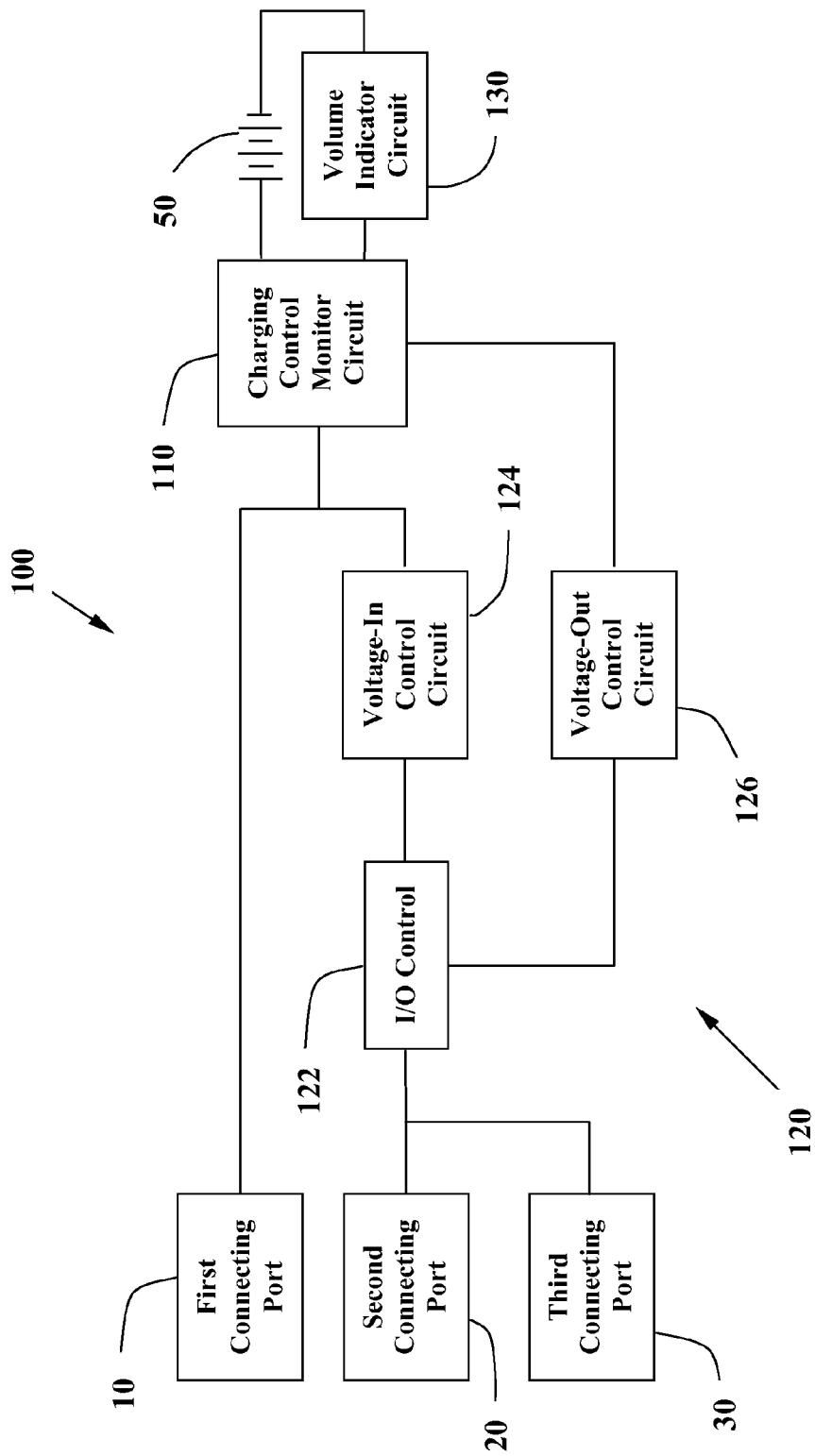
FIG. 5 is a block diagram of an alternative rechargeable battery pack.

FIG. 5 is a block diagram of the battery control circuit 100 of an alternative rechargeable battery pack 1. In one example shown in FIG. 5 shows, a volume indicator circuit 130 is incorporated in the battery control circuit 100 and arranged in direct serial connection with the battery 50. Such a volume indicator circuit 130 is also electrically coupled to the charging control monitor circuit 110 and receives signals detected by the charging control monitor circuit 110 concerning the available battery capacity remaining in the rechargeable battery pack 1. Based on the signals from the charging control monitor circuit 110, the volume indicator circuit 130 operates one or more capacity indicators 60 to notify the user of the remaining available battery capacity, as are shown in FIGS. 4a and 4b.

In another example shown in FIG. 5, a third connecting port 30 can be provided on the rechargeable battery pack 1. In one example, the third connecting port 30 can be formed or located on the rechargeable battery pack 1 in a location different from the first and the second connecting port 10, 20. Similar to the second connecting port 20, the third connecting port 30 can be formed for use as an input to charge the battery 50, or an output to supply power to an electronic device 2, or a combined input and output for external charging/output operations. In the example of FIG. 5, the third connecting port 30 can be formed to be electrically parallel to the second connecting port 20, as is shown in FIG. 5. In such a case, one of the second and third connecting ports 20, 30 can be used for the external charging/output operation of the rechargeable battery pack 1.

The third connecting port 30 can be in various forms including, but not limited to, a set of connecters and a receiving port for receiving various power connecters, such as a computer power cable connecter or a pin plug connecter. Additionally or alternatively, the third connecting port 30 can be formed as a different type of connecting port from those of the first and second connecting ports 10, 20. For example, the third connecting port 30 can conform to a third party defined charger connecter. In another example, the third connecting port 30 can be formed to connect to any of various other types of power sources, including but not limited to a solar panel.

The charging/output operation of the rechargeable battery pack 1 will now be described in great detail below.

During an internal charging/output operation of the rechargeable battery pack 1, the rechargeable battery pack 1 is first installed inside the electronic device 2. For example, the rechargeable battery pack 1 is installed in the battery chamber 2 of the electronic device 2 and enclosed therein by a battery cover 6 (see FIG. 1). During an internal output operation of the rechargeable battery pack 1, the first connecting port 10 can be electrically connected to the electronic device 2, such as through an internal electrical contact 8 on the electronic device 2, so that the rechargeable battery pack 1 can supply power to the electronic device 2.

Additionally or alternatively, the rechargeable battery pack 1 can be subjected to an internal battery charging operation while remaining inside the battery chamber 4 of the electronic device 2. During such internal battery charging operation, the first connecting port 10 of the rechargeable battery pack 1 is electrically connected to an external charging port (not shown) formed on the electronic device 2. When the electronic device 2 is coupled to an additional external power source, the rechargeable battery pack 1 is subjected to an internal battery charging operation.

The rechargeable battery pack 1 can be subjected to at least one of external charging and output operations through one of the first, second, and third connecting ports 10, 20, 30, when the rechargeable battery pack 1 is removed from and outside of the electronic device 2. For example, the rechargeable battery pack 1 can be charged and/or supply power using the first connecting port 10, which is formed as a pin connecter set defined by the manufacturer of the rechargeable battery pack 1 and/or the electronic device 2.

In another example, the second connecting port 20 on the rechargeable battery pack 1 can be used in at least one of external charging and output operations. In a preferred embodiment, various rechargeable battery packs 1 are formed with the same universal type of second connecting ports 20 (e.g., a USB type port shown in FIG. 2) to allow the various rechargeable battery packs 1 to be used with a universal charging connecter during the external battery charging operation. Such universal type of second connecting ports 20 can also be electrically connected to other rechargeable battery packs 1 or other electronic devices 2, through a suitable electric cable connecter, for at least one of external charging the output operations. In such a case, one rechargeable battery pack 1 can be used as an external battery box to charge either another rechargeable battery pack 1 or another electronic device 2 containing a rechargeable battery pack 1. For example, a user can use a rechargeable battery pack 1 in an MP3 player to supply power to a mobile phone or to charge the rechargeable battery pack 1 of the mobile phone.

In a further example, the third connecting port 30 on the rechargeable battery pack 1 can be similarly used in at least one of external charging and output operations. For example, the third connecting port 30 can be in any of various forms defined by a third party. In such a case, the rechargeable battery packs 1 with such third connecting port 30 can be charged by a charger connecter defined by the third party. For example, the third connecting port 30 can be connected to any of various other types of power sources, including but not limited to a solar panel.

The rechargeable battery packs 1 described herein have various advantages including, but not limited to, the following:

1. operating as an internal rechargeable battery for the electronic device 2 during its normal charging/output operation and as a backup and/or external batteries to supply power to various other devices, including another electronic device 2 or rechargeable battery pack 1;

2. forming a standard/universal type of second connecting ports 20 on various types of rechargeable battery packs 1 to allow such various types of rechargeable battery packs 1 be charged by a standard/universal battery charger connecter; and 3. forming a standard/universal type of second connecting ports 20 on various types of rechargeable battery packs 1 to allow such various types of rechargeable battery packs 1 to be electrically connected to one another and/or to another electronic device 2 for at least one of external charging and output operations.

The rechargeable battery packs 1 shown in the various drawing figures can be used in various electronic devices, such as mobile phones with or without operating systems, personal data assistants (PDA), mobile computers, portable video games, MP3 players, digital cameras, video cameras, voice recorders, portable global positioning systems (GPS), scanners, notebook computers, netbook computers, tablet computers, or other electronic devices that include rechargeable batteries. Additionally or alternatively, the rechargeable battery packs described herein can be formed as vehicle battery packs, or other rechargeable batteries.

While there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A rechargeable battery pack adapted to be installed inside an electronic device, the battery pack comprising:
   a battery housing adapted to be installed inside the electronic device;
   a battery enclosed in the battery housing;
   a first connecting port arranged on the battery housing and electrically coupled to the battery, the first connecting port configured for directly connecting to an internal electrical contact formed in the electronic device and operable to perform an internal charging/output operation with the battery when the rechargeable battery pack is installed inside the electronic device; and
   a second connecting port electrically coupled to the battery and operable to selectively perform external charging and output operations with the battery when the rechargeable battery pack is removed from the electronic device and electrically connected to one of an external charging device and a further electronic device;
   wherein the first and second connecting ports are separate from each other.

2. The battery pack of claim 1, wherein the first and second connecting ports are different types of connecting ports.

3. The battery pack of claim 1, wherein the first connecting port comprises a set of pin connecters.

4. The battery pack of claim 3, wherein the second connecting port is a USB type port.

5. The battery pack of claim 1, wherein the second connecting port is a USB type port.

6. The battery pack of claim 1, further comprising a switch operable to select between a charging operation and an output operation carried out through the second connecting port.

7. The battery pack of claim 1, further comprising one or more battery indicators reflecting battery capacity and charging status of the battery, wherein the one or more battery indicators are electrically coupled to the battery by a volume indicator circuit.

8. The battery pack of claim 1, further comprising a charging control monitor circuit operable to carry out thermal management of the battery during the at least one of external charging and output operations.

9. The battery pack of claim 8, further comprising the one or more control circuits electrically coupled between the second connecting port and the charging control monitor circuit, wherein the control circuits are operable to at least one of charge the battery and supply power to a second device, when the second connecting port is connected to a charging source and a second device, respectively.

10. The battery pack of claim 1, further comprising one or more control circuits electrically coupled between the second connecting port and the battery, wherein the one or more control circuits comprise an I/O control circuit, a voltage-in control circuit, and a voltage-out control circuit.

11. The battery pack of claim 1, further comprising a third connecting port electrically coupled to the battery and operable to perform the at least one of external charging and output operations, wherein the third connecting port is formed separately and differently from the first and second first connecting ports.

12. The battery pack of claim 11, wherein the first connecting port is operable during the at least one of external charging and output operations.

13. A combination of an electronic device and a rechargeable battery pack, wherein:
the electronic device is formed with a battery chamber for receiving a removable rechargeable battery pack, an internal electrical contact formed in the battery chamber, and an external charging port electrically connected with the internal contact; and
the rechargeable battery pack is configured to removably fit inside the battery chamber and retained therein during an internal charging/output operation, the rechargeable battery pack comprising:
a first connecting port arranged on the battery housing and electrically coupled to the battery, the first connecting port configured for directly connecting to an internal electrical contact formed in the electronic device and operable to perform an internal charging/output operation with the battery when the rechargeable battery pack is installed inside the electronic device; and
a second connecting port electrically coupled to the battery and operable to selectively perform external charging and output operations with the battery when the rechargeable battery pack is removed from the electronic device and electrically connected to one of an external charging device and a further electronic device;
wherein the first and second connecting ports are separate from each other.

14. The combination of claim 13, wherein second connecting port on rechargeable battery pack is the same as the external charging port on the device body.

15. The combination of claim 13, wherein the second connecting port is a USB type port.

16. The combination of claim 13, further comprising a battery cover for enclosing the rechargeable battery pack in the battery chamber.

17. The combination of claim 13, comprising a plurality of rechargeable battery packs, at least one of the rechargeable battery packs comprising:
a battery housing adapted to be installed inside the electronic device;
a battery enclosed in the battery housing;
a first connecting port arranged on the battery housing and electrically coupled to the battery, the first connecting port configured for directly connecting to an internal electrical contact formed in the electronic device and operable to perform an internal charging/output operation with the battery when the rechargeable battery pack is installed inside the electronic device; and
a second connecting port electrically coupled to the battery and operable to selectively perform external charging and output operations with the battery when the rechargeable battery pack is removed from the electronic device and electrically connected to one of an external charging device and a further electronic device;
wherein the first and second connecting ports are separate from each other.

18. A rechargeable battery pack adapted to be installed inside an electronic device, the battery pack comprising a connecting port and a switch operable to select between a charging operation and an output operation of the connecting port.

19. The battery pack of claim 18, wherein the connecting port is a USB type port.

20. The battery pack of claim 18, further comprising one or more battery indicators reflecting battery capacity and charging status of the battery pack.

* * * * *